(12) United States Patent
Sasaki

(10) Patent No.: US 8,192,708 B2
(45) Date of Patent: Jun. 5, 2012

(54) METHOD OF REMOVING $N_2O$ FROM WASTE GAS

(75) Inventor: Toichiro Sasaki, Minato-Ku (JP)

(73) Assignee: Metawater Co., Ltd., Minato-Ku (JP)

( * ) Notice: Subject to any disclaimer, the term of this patent is extended or adjusted under 35 U.S.C. 154(b) by 62 days.

(21) Appl. No.: 12/835,970

(22) Filed: Jul. 14, 2010

(65) Prior Publication Data

US 2010/0303699 A1    Dec. 2, 2010

Related U.S. Application Data

(63) Continuation of application No. PCT/JP2009/051739, filed on Feb. 3, 2009.

(30) Foreign Application Priority Data

Feb. 5, 2008   (JP) .................................. 2008-024797

(51) Int. Cl.
*B01D 53/56* (2006.01)
(52) U.S. Cl. .................................. 423/239.1; 423/239.2
(58) Field of Classification Search ............... 423/239.1, 423/239.2
See application file for complete search history.

(56) References Cited

U.S. PATENT DOCUMENTS

| 7,393,512 | B2 | 7/2008 | Schwefer et al. | |
| 2004/0228785 | A1 * | 11/2004 | Duclos et al. | 423/239.1 |
| 2010/0322834 | A1 * | 12/2010 | Ito et al. | 423/239.1 |

FOREIGN PATENT DOCUMENTS

| CA | 2607329 A1 | 11/2006 |
| JP | 08-057262 | 3/1996 |
| JP | 09-000884 A1 | 1/1997 |
| JP | 2001-286736 A1 | 10/2001 |
| JP | 2006-272240 A1 | 10/2006 |
| WO | 03/084646 | 10/2003 |

* cited by examiner

*Primary Examiner* — Timothy Vanoy
(74) *Attorney, Agent, or Firm* — Burr & Brown

(57) ABSTRACT

The invention provides a $N_2O$ removal method for a waste gas which is capable of stably decomposing and removing $N_2O$ even if the steam concentration in the waste gas is fluctuated. $N_2O$ is reduced and removed by bringing the waste gas containing $N_2O$ into contact with a reducing agent in the presence of a $N_2O$ decomposition catalyst. The temperature of the waste gas to be brought into contact with the $N_2O$ decomposition catalyst or the addition amount of the reducing agent is controlled in accordance with the steam concentration in the waste gas in a prior stage of the $N_2O$ decomposition catalyst. Therefore, the $N_2O$ decomposition efficiency is prevented from being decreased. An iron-zeolite based catalyst may be used as the $N_2O$ decomposition catalyst and methane, propane, ammonia, etc. may be used as the reducing agent.

5 Claims, 5 Drawing Sheets

METHOD OF REMOVING $N_2O$ FROM WASTE GAS

CROSS-REFERENCE TO RELATED APPLICATIONS

This application is a continuation of PCT/JP2009/051739 having a filing date of Feb. 3, 2009, which claims priority to JP2008-024797 having a filing date of Feb. 5, 2008.

FIELD OF THE INVENTION

The present invention relates to a method for removing $N_2O$ from a waste gas of a wastewater sludge incinerator or the like.

BACKGROUND OF THE INVENTION

A small amount of $N_2O$ (nitrous oxide) is contained in a waste gas of a wastewater sludge incinerator and a boiler of a thermal power plant, an exhaust gas of an automobile, or the like. $N_2O$ is one of greenhouse effect gases and has a global warming potential of 310 and causes the global warming effect 310 times as high as that of carbon dioxide. Therefore, in terms of global warming prevention, it is strongly desired to lessen the emission of $N_2O$ to the atmospheric air.

Accordingly, methods for reducing and removing $N_2O$ by using $N_2O$ decomposition catalysts have conventionally been proposed as a method for removing $N_2O$ from waste gases. For example, Patent Documents 1, 2, and 3 disclose methods for reducing and removing $N_2O$ using iron-zeolite based catalysts obtained by depositing iron or iron ion on zeolites. It is described that such iron-zeolite based catalysts show little deterioration of catalytic activity by $NO_x$ and $SO_x$, in waste gases.

The above-mentioned iron-zeolite based catalysts are to be used in a temperature range of about 350 to 500° C. and a $N_2O$ decomposition catalyst to be used in a low temperature range is disclosed in Patent Document 4. This $N_2O$ decomposition catalyst is obtained by depositing a noble metal such as Rh, Ir, Pd, Pt, Ru, or the like on an alumina or zeolite carrier and is explained to be capable of decomposing $N_2O$ at 400° C. or lower.

All of these decomposition catalysts of Patent Documents 1 to 4 are for reducing and removing $N_2O$ by reaction of $N_2O$ with a reducing agent such as a hydrocarbon or ammonia in a temperature range of about 400° C. and the reaction formula is as follows.

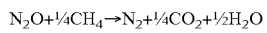

$$N_2O + \tfrac{1}{4}CH_4 \rightarrow N_2 + \tfrac{1}{4}CO_2 + \tfrac{1}{2}H_2O$$

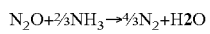

$$N_2O + \tfrac{2}{3}NH_3 \rightarrow \tfrac{4}{3}N_2 + H_2O$$

The above-mentioned Patent Documents 1 to 4 do not contain any description regarding means of controlling the addition. amount of a reducing agent or waste gas temperature. However, in actual plant facilities, the waste gas properties are always fluctuated significantly and for example, in a wastewater sludge incinerator, according to the change of the components of wastewater sludge to be loaded and water content, the steam concentration in a waste gas is considerably fluctuated. Further, the steam derived from hydrogen in a fuel is fluctuated along with the combustion condition.

When the steam amount in a waste gas is fluctuated as described, the activity of a $N_2O$ decomposition catalyst is fluctuated and thus the capability of $N_2O$ removal is considerably fluctuated. As a result, there is a problem that stable waste gas treatment cannot be carried out. Although the lowering of the catalytic activity of an iron-zeolite based catalyst due to steam is said to be relatively slight, considerable deterioration of the capability of $N_2O$ removal is inevitable also in the case of using the iron-zeolite based catalyst.

Patent Document 1: Japanese Patent No. 3550653
Patent Document 2: Japanese Patent No. 3681769
Patent Document 3: Japanese Patent Application Publication (Laid-Open) No. 2005-527350
Patent Document 4: Japanese Patent Application Laid-Open (JP-A) No. 2006-272240

SUMMARY OF THE INVENTION

Accordingly, an object of the present invention is to solve the above-mentioned conventional problems and to provide a method for removing $N_2O$ from a waste gas which stably decomposes and removes $N_2O$ even if the property fluctuation of a waste gas, particularly fluctuation of the steam concentration occurs.

The method for removing $N_2O$ from a waste gas of the present invention completed for solving the above-mentioned problems is a method of removing $N_2O$ from a waste gas for reductively removing $N_2O$ by bringing the waste gas containing $N_2O$ into contact with a reducing agent in the presence of a $N_2O$ decomposition catalyst so as to reduce and remove $N_2O$, wherein the temperature of the waste gas to be brought into contact with the $N_2O$ decomposition catalyst or the addition amount of the reducing agent are controlled in accordance with the steam concentration in the waste gas in a prior stage of the $N_2O$ decomposition catalyst. In the invention, as the steam concentration in the waste gas in the prior stage of the $N_2O$ decomposition catalyst, a value measured by a steam concentration detector can be employed or a value calculated from the saturated steam pressure corresponding to the waste gas temperature at the outlet of a flue gas treatment tower can be employed.

In addition, as the $N_2O$ decomposition catalyst, an iron-zeolite based catalyst can be used, and also as the $N_2O$ decomposition catalyst, a catalyst obtained by depositing a noble metal on an alumina or zeolite carrier can be used. Further, as a reducing agent, any one of methane, propane, and ammonia can be used, and the waste gas may be a waste gas from a wastewater sludge incinerator.

(Effects of the Invention)

In the present invention, the temperature of the waste gas to be brought into contact with the $N_2O$ decomposition catalyst or the addition amount of the reducing agent is controlled according to the steam concentration in the waste gas in the prior stage of the $N_2O$ decomposition catalyst. That is, when the steam concentration of the waste gas is increased, the waste gas temperature is increased or the addition amount of the reducing agent is increased to improve the $N_2O$ decomposition efficiency. Accordingly, even if the properties of the waste gas are fluctuated, particularly the steam concentration is fluctuated; stable $N_2O$ decomposition removal is made possible. As the steam concentration in the waste gas in the prior stage of the $N_2O$ decomposition catalyst, a value measured by a steam concentration detector can be employed and also a value calculated from the saturated steam pressure corresponding to the waste gas temperature at the outlet of a flue gas treatment tower can be employed and in the latter case, merely a waste gas thermometer may be used.

EXPLANATION OF LETTERS OR NUMERALS

Figure 1:
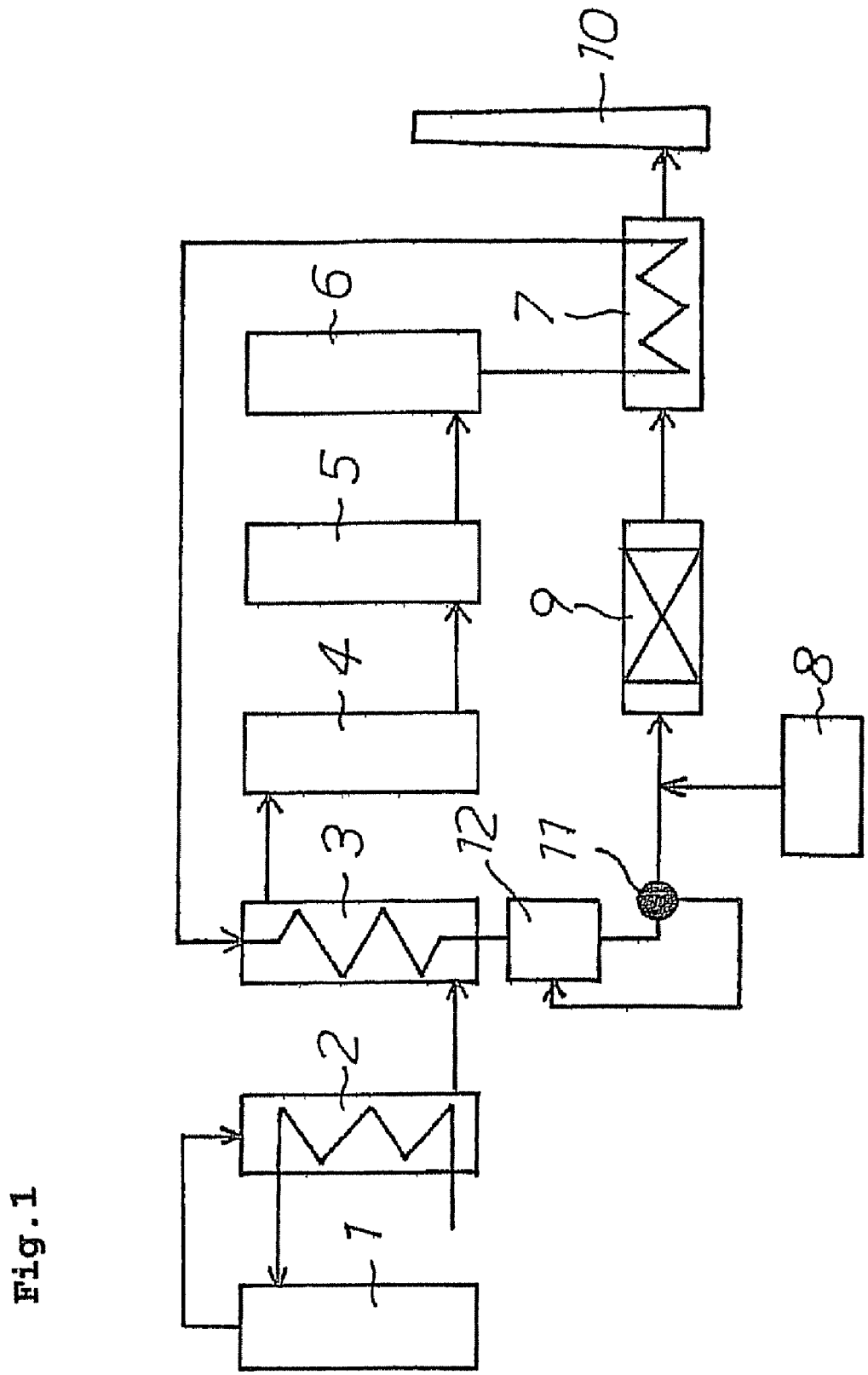
FIG. 1 is a block diagram showing a first embodiment of the invention.

1. Wastewater sludge incinerator
2. Air preheater
3. First heater
4. Cooling tower
5. Bag filter
6. Flue gas treatment tower
7. Second heater
8. Reducing agent supply apparatus
9. $N_2O$ decomposition catalyst
10. Chimney
11. Steam concentration detector
12. Waste gas temperature control means

DETAILED DESCRIPTION OF THE INVENTION

A preferable embodiment of the invention will be described below. In this embodiment, a waste gas containing $N_2O$ is a wastewater sludge incineration waste gas; however the type of the waste gas is not limited to that.

FIG. 1 is a block diagram showing a first embodiment of the present invention, and 1 denotes a wastewater sludge incinerator; 2 denotes an air preheater; 3 denotes a first heater; 4. denotes a cooling tower; 5 denotes a bag filter; 6 denotes a flue gas treatment tower (scrubber); 7 denotes a second heater; 8 denotes a reducing agent supply apparatus; 9 denotes a $N_2O$ decomposition catalyst; and 10 denotes a chimney.

Wastewater sludge is incinerated using heavy oil or another auxiliary fuel in a wastewater sludge incinerator 1. The combustion temperature of the Wastewater sludge incinerator 1 is generally in a range of 800 to 850° C. As the wastewater sludge incinerator 1, for example, a fluidized-bed furnace is employed. The waste gas containing $N_2O$ at a temperature as high as about 800 to 850° C. and emitted from the wastewater sludge incinerator 1 is introduced into an air preheater 2 to preheat air to be supplied to the wastewater sludge incinerator 1 and sent to a first heater 3 at 400 to 550° C. The waste gas passed through the first heater 3 is cooled to about 300° C. and further cooled to about 200° C. in a cooling tower 4, and dust contained in the waste gas is removed in the bag filter 5.

Because the bag filter 5 cannot treat a high temperature gas, the temperature of the waste gas is decreased in the above-mentioned manner is. The waste gas purified by passing the bag filter 5 is sent to the flue gas treatment tower 6 and brought into contact with water falling from above to remove $SO_x$. and HCl from the waste gas. The temperature of the waste gas brought into contact with water in the flue gas treatment tower 6 is lowered to about 20 to 50° C. As described, since the $N_2O$ decomposition catalyst requires the temperature to be about 300 to 500° C., the waste gas flowing out of the flue gas treatment tower 6 is again heated to that temperature range by being led to a second heater 7 and the first heater 3.

Although an iron-zeolite based catalyst or a catalyst obtained by depositing a noble metal on an alumina or zeolite carrier can be used as the $N_2O$ decomposition catalyst 9, the one obtained by depositing iron on a zeolite carrier is used in this embodiment. Concretely, a catalyst used is an iron-bearing zeolite obtained by mixing a commercially available ammonium-zeolite and $FeSO_4$ by a ball mill at room temperature, preheating the obtained powder at 400 to 600° C. in a muffle kiln, further mixing the powder with a binder, and extrusion-molded the powder into a column-like shape with a diameter of 2 mm and a length of 5 mm. The type of the binder is not particularly limited and aluminum silicate such as kaolin may be used.

In this embodiment, a steam concentration detector 11, a reducing agent supply apparatus 8, and waste gas temperature control means 12 such as an electric heater are installed in the prior part where the waste gas heated to the temperature range of 300 to 500° C. by the first heater 3 is provided to the above-mentioned $N_2O$ decomposition catalyst. A commercially available product can be used as the steam concentration detector 11 to detect the steam concentration in the waste gas, and the waste gas temperature control means 12 is controlled based on the detected steam concentration to control the waste gas temperature to be brought into contact with the $N_2O$ decomposition catalyst. As being made clear from the data of the experiment example described below, although the $N_2O$ decomposition efficiency is lowered due to increase of the steam concentration, the decrease can be prevented by increasing the waste gas temperature. In this embodiment, although the electric heater is employed as the waste gas temperature control means 12, the waste gas temperature may be controlled by changing the heat exchange condition in the first heater 3.

Thereafter, as a reducing agent, a hydrocarbon gas such as methane and propane, or ammonia is added to the waste gas by a reducing agent supply apparatus 8. In this manner, the waste gas is brought into contact with the reducing agent in the presence of the $N_2O$ decomposition catalyst to reduce and remove $N_2O$. Thereafter, the waste gas is passed through the second heater 7, heat-exchanged, and released through a chimney. According to this first embodiment, the waste gas temperature is increased when the steam concentration of the waste gas is increased. Therefore, decrease of the catalytic activity of the $N_2O$ decomposition catalyst 9 can be suppressed, so that stable $N_2O$ decomposition and removal is made possible.

Figure 2:
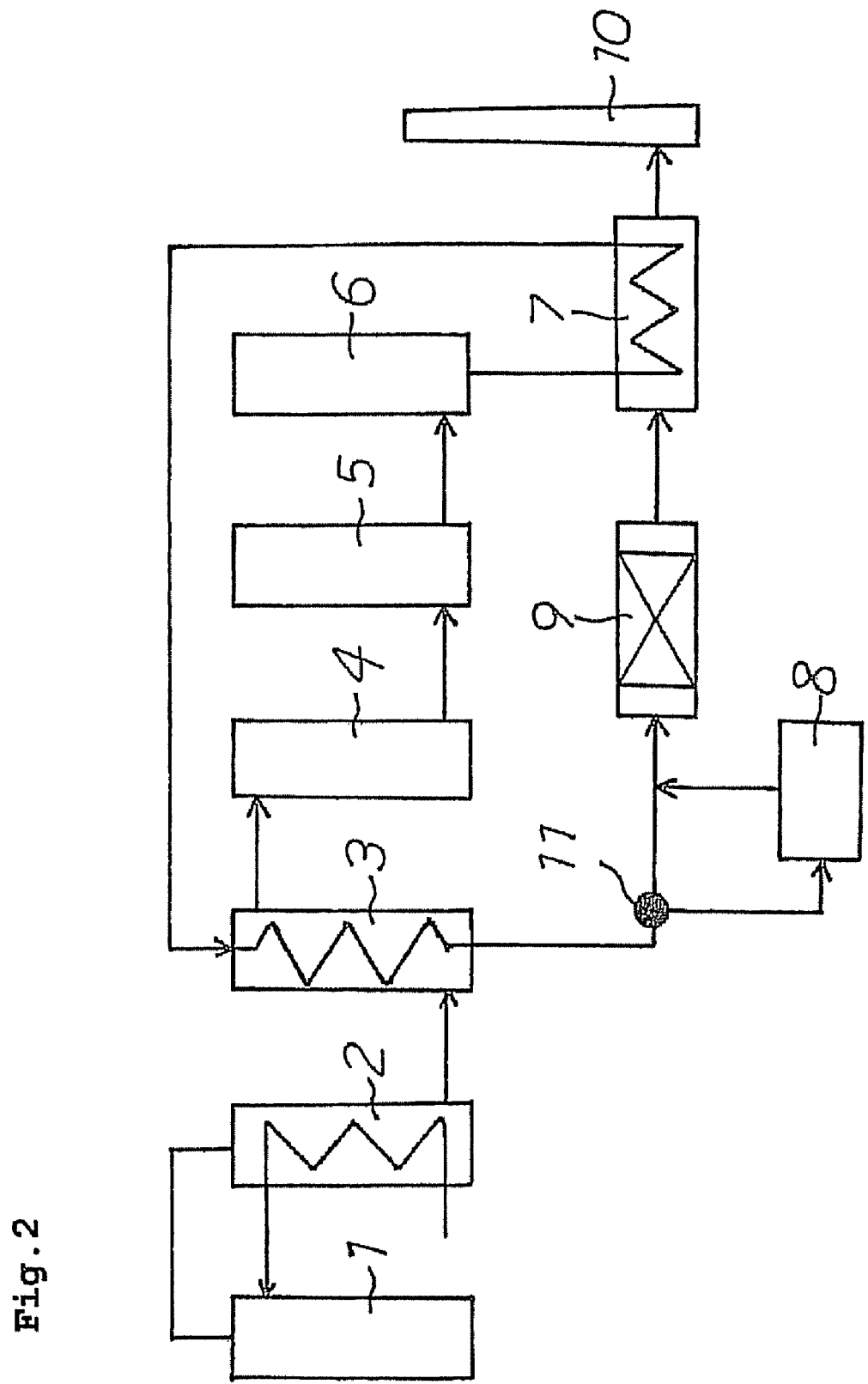
FIG. 2 is a block diagram showing a second embodiment of the invention.

FIG. 2 is a block diagram showing a second embodiment of the invention, and the basic configuration is the same as the first embodiment. However, in the second embodiment, the addition amount of the reducing agent to be supplied to the waste gas is controlled by the reducing agent supply apparatus 8 based on the steam concentration detected by the steam concentration detector 11 without using the waste gas temperature means 12. That is, if it is possible that the $N_2O$ decomposition efficiency is lowered due to increase of the steam concentration, the decrease of the $N_2O$ decomposition efficiency is suppressed by increasing the addition amount of the reducing agent. Stable $N_2O$ decomposition removal is also made possible by the second embodiment.

The experiment results are shown below, proving that the decrease of the $N_2O$ decomposition efficiency can be suppressed by controlling the waste gas temperature or the addition amount of the reducing agent in accordance with the steam concentration in the waste gas.

The $N_2O$ decomposition catalyst used here is the same as employed in the above-mentioned embodiment, that is the iron-bearing zeolite obtained by extrusion molding into a column-like shape with a diameter of 2 mm and a length of 5 mm and packed in a column and the $N_2O$ decomposition efficiency is measured by leading a gas simulated as the waste gas to the column at $SV=1100\ h^{-1}$.

Figure 3:
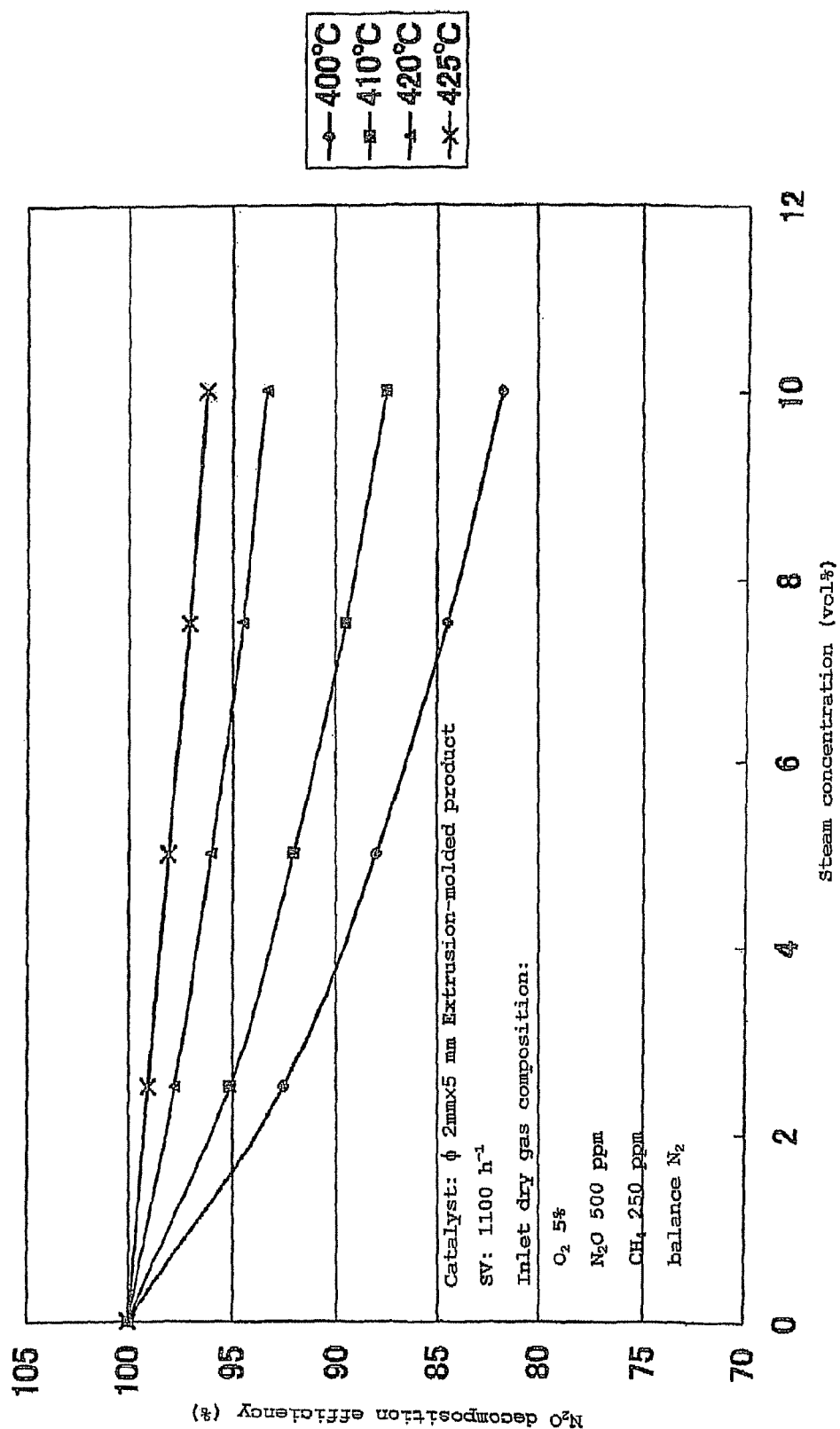
FIG. 3 is a graph showing the effect of the steam concentration and the waste gas temperature on the $N_2O$ decomposition efficiency.

The composition of dry gas contains 5 of oxygen and the balance of nitrogen. 500 ppm of $N_2O$ and 250 ppm of methane gas as a reducing agent are added to the dry gas. Further the steam concentration is changed in a range of 0 to 10% and the gas temperature is changed in a range of 400 to 425° C. and thus the effect of the steam concentration and the waste gas temperature on the $N_2O$ decomposition efficiency is experimented. The results are shown as the graph in FIG. 3.

At first, if the steam concentration is 0%, the $N_2O$ decomposition efficiency is 100% in a gas temperature range of 400 to 425° C.; however the $N_2O$ decomposition efficiency is lowered more as the steam concentration is increased more in the case of any gas temperature and particularly, in the case that the gas temperature is 400° C., when the steam concentration reaches 10%, the $N_2O$ decomposition efficiency is lowered no more than 82%. However, even if the steam concentration reaches 10%, in the case that the gas temperature is 425° C., the $N_2O$ decomposition efficiency is 96.5%. Therefore, it is made possible to keep the $N_2O$ decomposition efficiency in a level of 95% or higher constantly regardless of the steam concentration fluctuation by controlling the gas temperature to be 400° C. when the steam concentration is 0%; to be 410° C. when it is 2%; to be 420° C. when it is 5%; and to be 425° C. when it is 10%.

In addition, the $N_2O$ decomposition efficiency is kept in a level of 95% or higher constantly regardless of the steam concentration fluctuation if the gas temperature is kept at 425° C. constantly; however it required extra energy and it is not preferable in terms of the cost as well as the prevention of global warming.

Figure 4:
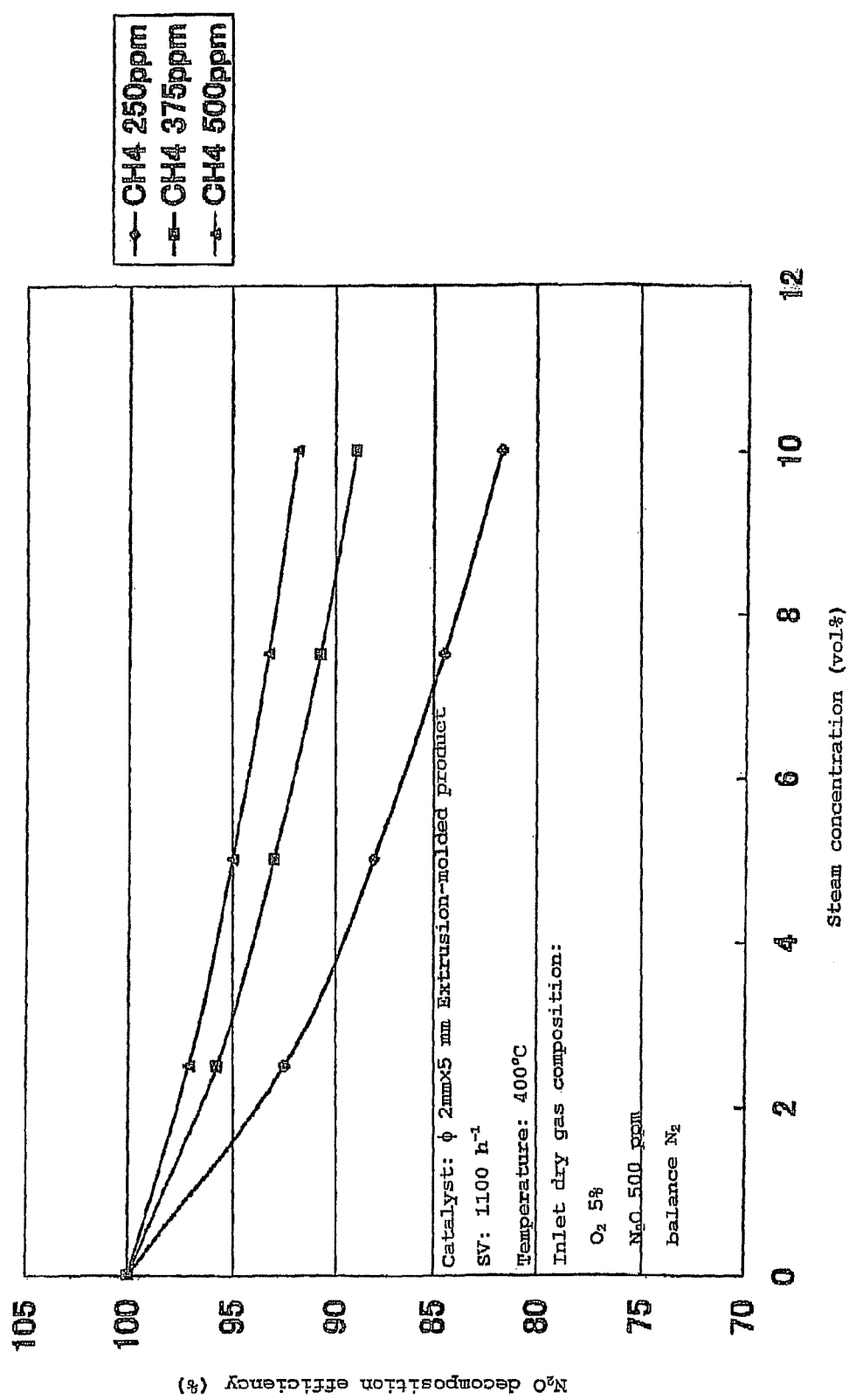
FIG. 4 is a graph showing the effect of the steam concentration and the reducing agent concentration on the $N_2O$ decomposition efficiency.

Next, using the same apparatus as described above, an experiment of the effect of the steam concentration and the methane gas concentration on the $N_2O$ decomposition efficiency is carried out by changing the steam concentration in a range of 0 to 10% and changing the addition amount of methane gas as a reducing agent in a range of 250 to 500 ppm. The gas temperature is kept at 400° C. The results are shown as the graph in FIG. 4. Similarly to the above-mentioned experiment, as the steam concentration is increased more, the $N_2O$ decomposition efficiency is lowered more. When the reducing agent concentration is 250 ppm, the steam concentration reaches 10%, and the $N_2O$ decomposition efficiency is lowered to 82%. However, even if the steam concentration reaches 10%, the $N_2O$ decomposition efficiency is 92% by controlling the reducing agent concentration to be 500 ppm. Therefore, it is made possible to keep the $N_2O$ decomposition efficiency in a level of 92% or higher constantly regardless of the steam concentration fluctuation by controlling the reducing agent concentration to be 250 ppm when the steam concentration is 0%; the reducing agent concentration to be 375 ppm when the steam concentration is 5%; and the reducing agent concentration to be 500 ppm when the steam concentration is 10%.

In the above-mentioned embodiment, the $N_2O$ decomposition efficiency is prevented from being decreased by independently controlling the gas temperature and reducing agent concentration in accordance with the fluctuation of the steam concentration. However, it is also possible to simultaneously control both and in that case, it is made possible to achieve a better effect.

In the case that the flow of the treatment of the waste gas in a flue gas treatment tower 6 as shown in FIGS. 1 and 2 is employed, the steam concentration in the waste gas is determined in accordance with the temperature and the saturated steam pressure of the waste gas at the outlet of the flue gas treatment tower 6. It is because the waste gas temperature is decreased by contact of the waste gas with water in the flue gas treatment tower 6 and the water in the waste gas is condensed.

Figure 5:
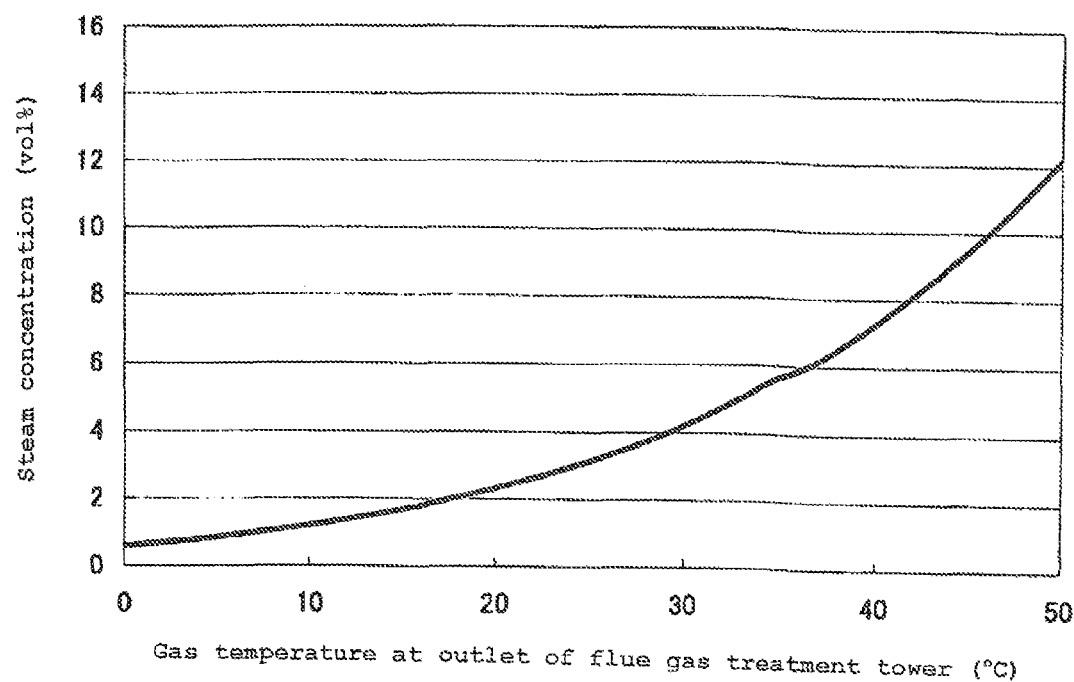
FIG. 5 is a graph showing the relation of the waste gas temperature and the steam concentration at the outlet of a flue gas treatment tower.

The waste gas temperature at the outlet of the flue gas treatment tower 6 is affected by the operation conditions such as the waste gas amount or the outside temperature; however it is generally about 20 to 50° C. In this case, the steam concentration in the waste gas becomes about 2 to 12% as shown in the graph of FIG. 5 calculated from the saturated steam pressure.

Since the steam concentration is kept up to the prior stage of the $N_2O$ decomposition catalyst 9, the value calculated from the saturated steam pressure corresponding to the waste gas temperature at the outlet of the flue gas treatment tower may be employed as the steam concentration in the waste gas in the prior stage of the $N_2O$ decomposition catalyst as claimed in claim 3. Therefore, with no need of use of the steam concentration detector 11, the steam concentration in the waste gas can be evaluated by using only a thermometer.

The invention claimed is:

1. A method of removing $N_2O$ from a waste gas for reductively removing $N_2O$ by bringing a waste gas containing $N_2O$ into contact with a reducing agent in the presence of a $N_2O$ decomposition catalyst, wherein the temperature of the waste gas to be brought into contact with the $N_2O$ decomposition catalyst or the addition amount of the reducing agent is controlled in accordance with the steam concentration in the waste gas in the prior stage of the $N_2O$ decomposition catalyst, the steam concentration being calculated from the saturated steam pressure corresponding to the waste gas temperature at an outlet of a flue gas treatment tower.

2. The method of removing $N_2O$ from a waste gas according to claim 1, wherein an iron-zeolite based catalyst is used as the $N_2O$ decomposition catalyst.

3. The method of removing $N_2O$ from a waste gas according to claim 1, wherein a catalyst obtained by depositing a noble metal on an alumina or zeolite carrier is used as the $N_2O$ decomposition catalyst.

4. The method of removing $N_2O$ from a waste gas according to claim 1, wherein one of methane, propane, and ammonia is used as the reducing agent.

5. The method of removing $N_2O$ from a waste gas according to claim 1, wherein the waste gas is a waste gas of a wastewater sludge incinerator.

\* \* \* \* \*